US012548958B1

(12) United States Patent
Wu et al.

(10) Patent No.: US 12,548,958 B1
(45) Date of Patent: Feb. 10, 2026

(54) MINI TRAVEL POWER CONVERSION SOCKET

(71) Applicant: Dongguan Heincro Technology Co., Ltd, Dongguan (CN)

(72) Inventors: Xuexiang Wu, Guangdong (CN); Ziyuan Liu, Ji'an (CN); Junwen Xiong, Nanchang (CN)

(73) Assignee: Dongguan Heincro Technology Co., Ltd, Dongguan (CN)

(*) Notice: Subject to any disclaimer, the term of this patent is extended or adjusted under 35 U.S.C. 154(b) by 0 days.

(21) Appl. No.: 19/211,386

(22) Filed: May 19, 2025

(51) Int. Cl.

| | |
|---|---|
| ***H01R 31/06*** | (2006.01) |
| ***H01R 13/35*** | (2006.01) |
| ***H01R 13/502*** | (2006.01) |
| ***H01R 13/66*** | (2006.01) |
| ***H01R 13/68*** | (2011.01) |
| ***H01R 13/717*** | (2006.01) |
| *H01R 103/00* | (2006.01) |

(52) U.S. Cl.
CPC ........... *H01R 31/065* (2013.01); *H01R 13/35* (2013.01); *H01R 13/502* (2013.01); *H01R 13/6658* (2013.01); *H01R 13/68* (2013.01); *H01R 13/7172* (2013.01); *H01R 2103/00* (2013.01)

(58) Field of Classification Search
CPC .... H01R 31/065; H01R 13/35; H01R 13/502; H01R 13/6658; H01R 13/68; H01R 13/7172; H01R 2103/00
See application file for complete search history.

(56) References Cited

U.S. PATENT DOCUMENTS

| | | | | |
|---|---|---|---|---|
| 9,831,622 | B1 * | 11/2017 | Lin | H01R 29/00 |
| 10,297,965 | B1 * | 5/2019 | Yang | H01R 31/06 |
| 2007/0047182 | A1 * | 3/2007 | Hassend | H01R 13/6675 361/600 |
| 2022/0393393 | A1 * | 12/2022 | Liao | H01R 31/06 |
| 2023/0108383 | A1 * | 4/2023 | Zuo | H05K 5/0247 |
| 2023/0286397 | A1 * | 9/2023 | Zhao | H01R 13/5202 |
| 2024/0072488 | A1 * | 2/2024 | Lin | H01R 13/58 |

FOREIGN PATENT DOCUMENTS

| | | | | |
|---|---|---|---|---|
| CN | 110994309 A | * | 4/2020 | H01R 13/502 |

* cited by examiner

*Primary Examiner* — Abdullah A Riyami
*Assistant Examiner* — Nader J Alhawamdeh
(74) *Attorney, Agent, or Firm* — Nicholas Makridakis

(57) ABSTRACT

The present invention provides a mini travel power conversion socket, including: a face cover, a light guide post, a door spring, a main body, and a bottom cover. This invention provides a mini travel power conversion socket equipped with British plugs, European plugs, and American/Australian rotatable adapter plugs; the socket section is designed with a universal socket panel that can accommodate plugs from multiple countries. The product is compact and miniaturized, with a socket safety protection door set in the middle area between the face cover and the main body. It can support AC plugs/sockets capable of carrying 10 A high current. Inside the hardware socket bracket above, there is an integrated L/N pole socket hardware guide plate that is widened and thickened. Below the hardware connection bracket, there is an integrated plug hardware guide plate, along with a positioning block that can independently extend individual plugs.

6 Claims, 10 Drawing Sheets

MINI TRAVEL POWER CONVERSION SOCKET

TECHNICAL FIELD

The present application relates to the field of electrical appliance plug-in devices, and particularly to a mini travel power conversion socket.

BACKGROUND

As travel adapters become more prevalent in the market and economies rapidly develop, trade and cultural exchanges between countries have deepened, bringing many conveniences to those traveling for business or leisure. However, due to the large size and bulkiness of existing travel adapter plugs, they cause inconvenience for people working or visiting in different places when carrying or storing them, significantly reducing user experience.

Existing conversion socket products are generally large in size, heavy, with small areas of metal guide plates, rigid assembly contacts, and low current-carrying capacity of fuses. This result in the entire product having a low current-carrying capacity, making it prone to overheating, poor contact, short circuits, or even burning out, which pose safety hazards. Additionally, the production and assembly processes are complex, the size is too large, and they are inconvenient for storage and transportation, leading to significant waste in subsequent production, packaging, and transportation costs.

Therefore, it is necessary to provide a mini travel power conversion socket to solve the above technical problems.

SUMMARY

The present disclosure aims to provide a mini travel power conversion socket to address the common issues with traditional conversion sockets and chargers on the market. These existing products are generally bulky, have low current-carrying capacity for AC plugs/sockets, which can easily lead to overheating, poor contact, short circuits, and other safety hazards. Additionally, they are complex to manufacture and assemble, too large in size, making them inconvenient for storage and transportation, and resulting in significant waste in production/packaging and transportation costs.

In order to solve the above technical problems, the present disclosure provides a mini travel power conversion socket, including: a cover, a light guide column, a door spring, a main body and a lower cover.

A top of the main body is equipped with a two-prong shutter and a three-prong shutter. A PCBA (printed circuit board assembly) board is provided on one side inside the main body. A European standard plug assembly is provided on one side surface of the main body. A British standard plug assembly and an American-Australian standard plug assembly are provided on another side surface of the main body. The British standard plug assembly includes a British standard plug bracket, left and right L/N pole hardware inserts, left and right L/N pole British standard hardware plugs, a British standard plug push button, and a button spring. The American-Australian standard plug assembly includes an American-Australian standard plug bracket, American-Australian standard hardware plugs, support springs, American-Australian standard hardware inserts, riveted copper sleeves, and an American-Australian standard plug push button. The European standard plug assembly includes a European standard plug sleeve, a European standard plug bracket, the left and right L/N pole hardware inserts, left and right L/N European standard hardware plugs, and a European standard plug push button.

The light guide column is set on a top side of the cover, and the door spring is set inside the main body.

Preferably, a bottom of the main body is provided with a first L pole (herein L refers to live wire), a first N pole (herein N refers to neutral wire), a hardware socket bracket, a fuse connection hardware, a copper column connection hardware and a conductive copper column.

Preferably, the hardware socket bracket includes a conductive copper column positioning column and an assembly groove.

Preferably, a top of the lower cover is provided with a hardware connection bracket, a second L pole, a second N pole, a third L pole, a third N pole, a plug limit block and a British standard ground wire plug. The hardware connection bracket includes a first guide limit column and a second guide limit column.

Preferably, a first fuse and a fuse bracket component are provided on both sides inside the lower cover.

Preferably, a threaded column is fixedly installed on one side of a top of the cover, a blocking block is fixedly installed at a top end of the threaded column, a protective cover is fitted on a bottom of an outer surface of the threaded column, and an adjustment component is threadedly engaged with a middle of the outer surface of the threaded column.

Preferably, the adjustment component includes a first connecting ring block, a second connecting ring block, and a threaded layer. The first connecting ring block is threadedly engaged with the outer surface of the threaded column. The second connecting ring block is fixedly installed in a middle of a top of the first connecting ring block, and the threaded hole is located in a middle of a bottom of the first connecting ring block.

Compared with related technologies, the mini travel power conversion socket provided by the present disclosure has the following beneficial effects.

The present disclosure provides the mini travel power conversion socket, by providing the British, European, and American-Australian standard rotatable adapter plugs, so that the socket section includes a universal socket panel that can accommodate plugs from multiple countries, such as British, European, American, Australian, Italian, and small South African sockets. This product is compact and miniaturized, with a socket safety shutter set in the middle area between the cover and the main body. It can support AC plugs/sockets with a maximum current of 10 A. Inside the hardware socket bracket above, there is the integrated L/N pole socket hardware guide plate that is widened and thickened. Below the hardware connection bracket, there is the integrated hardware plug guide plate, along with the positioning block that can independently extend individual plugs. This design not only achieves miniaturization but also addresses product safety issues, making it easy to store and carry, while saving on production and transportation costs.

Figure 1:
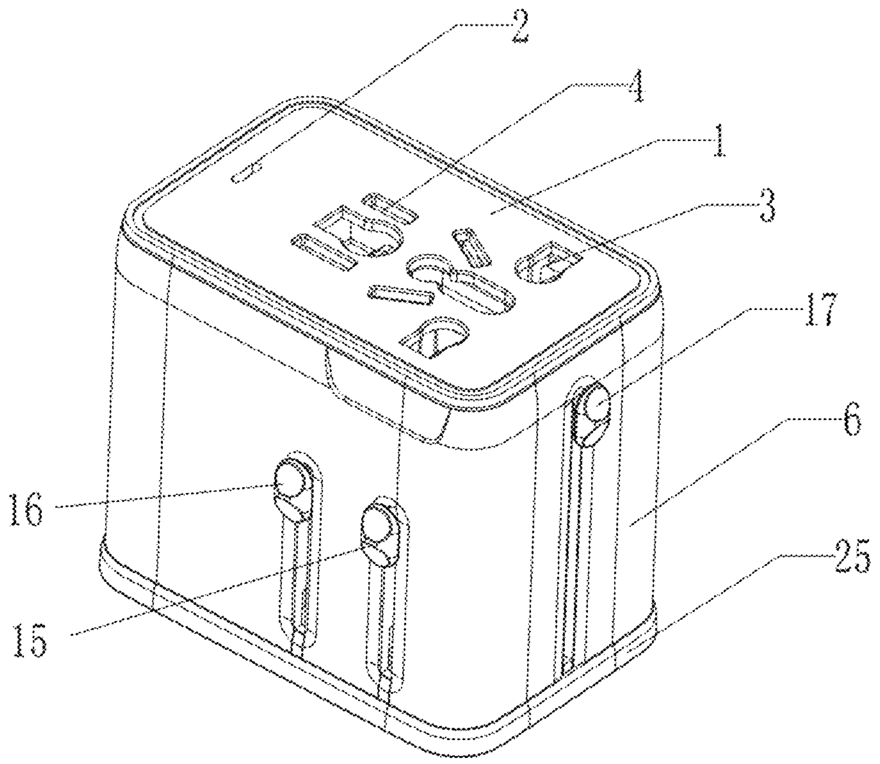
FIG. 1 is a structural schematic diagram of a mini travel power supply conversion socket in accordance with some embodiments of the present disclosure.

In the drawings, reference numerals as follows. 1, cover; 2, light guide column; 3, two-prong shutter; 4, three-prong shutter; 5-1, door spring; 6, main body; 7, PCBA board; 8, first L pole; 9, first N pole; 10, hardware socket bracket; 10-1, conductive copper column positioning column; 10-2, assembly groove; 11, fuse connection hardware; 13, copper column connection hardware; 14-1, conductive copper column; 15, British standard plug assembly; 15-1, British standard plug bracket; 15-2, left and right L/N pole hardware inserts; 15-3, left and right L/N pole British standard hardware plugs; 15-4, British standard plug push button; 15-5, button spring; 16, American-Australian standard plug assembly; 16-1, American-Australian standard plug bracket; 16-2, American-Australian standard hardware plug; 16-3, support spring; 16-4, American-Australian standard hardware insert; 16-5, riveted copper sleeve; 16-6, American-Australian standard plug push button; 17, European standard plug assembly; 17-1, European standard plug sleeve; 17-2, European standard plug bracket; 17-3, left and right L/N pole hardware inserts; 17-4, left and right L/N European standard hardware plugs; 17-5, European standard plug push button; 18, hardware connection bracket; 18-1, first guide limit column; 18-2, second guide limit column; 19, second L pole; 20, second N pole; 21, third L pole; 22, third N pole; 23, plug limit block; 24, British standard ground wire plug; 25, lower cover; 26-1, first fuse; 27, fuse bracket component; 30, protective cover; 31, threaded column; 32, blocking block; 33, adjustment component, 331, first connecting ring block, 332, second connecting ring block, 333, threaded hole.

DETAILED DESCRIPTION OF THE EMBODIMENTS

The present disclosure is further described below with reference to the drawings and embodiments.

Example 1

Figure 2:
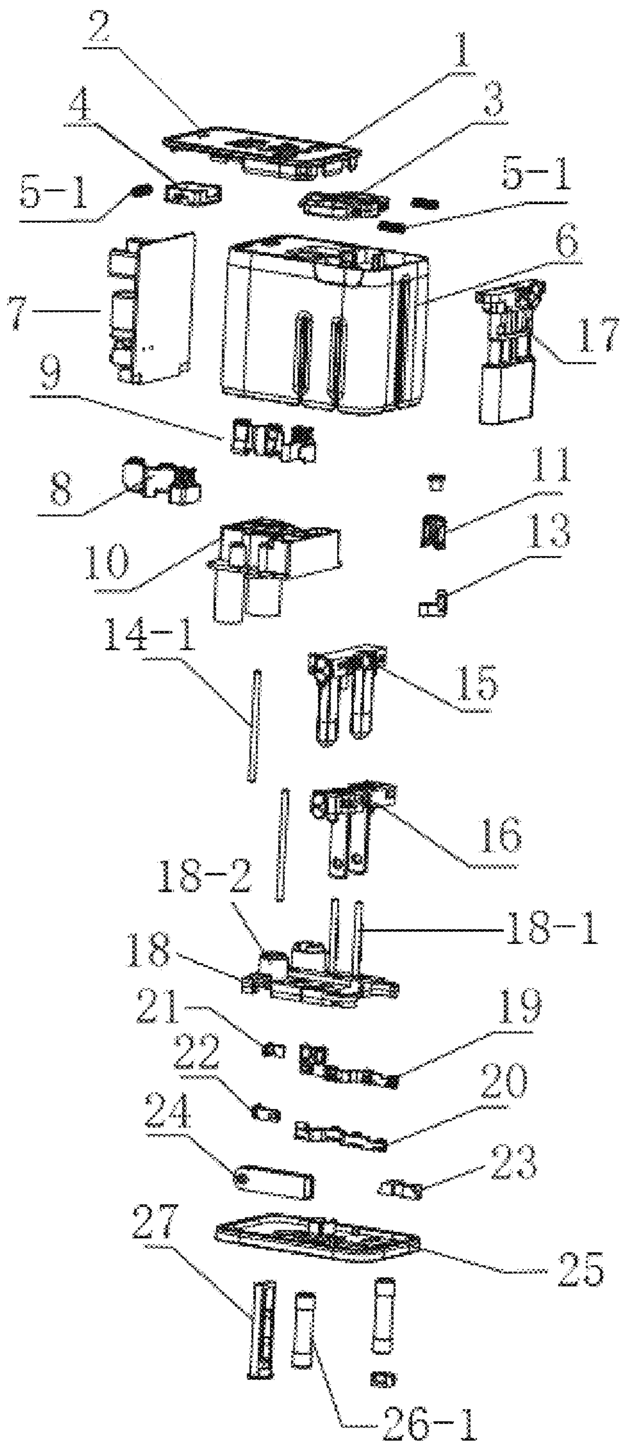
FIG. 2 is an exploded view of the mini travel power supply conversion socket in accordance with some embodiments of the present disclosure.
Figure 3:
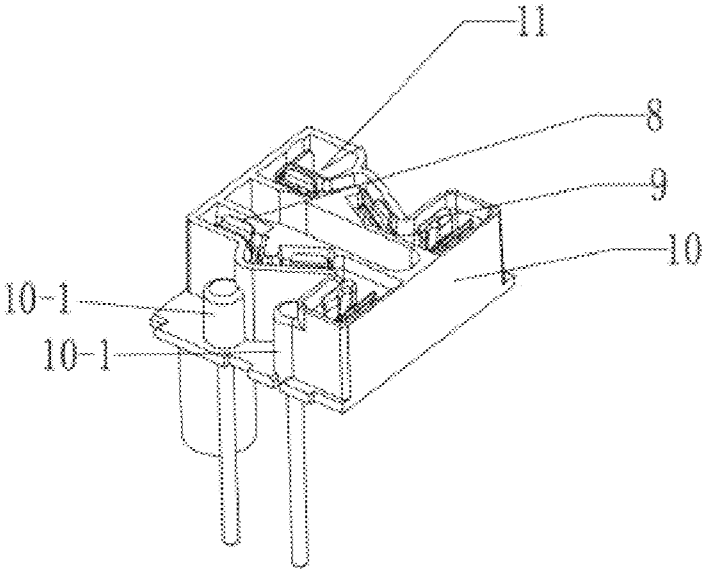
FIG. 3 is a top view of a hardware socket bracket as shown in FIG. 2.
Figure 4:
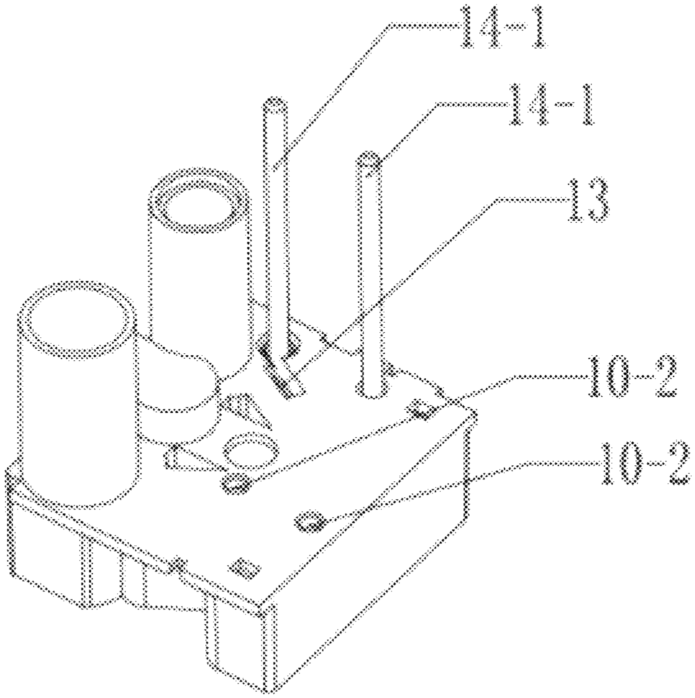
FIG. 4 is a bottom view of the hardware socket bracket as shown in FIG. 2.
Figure 5:
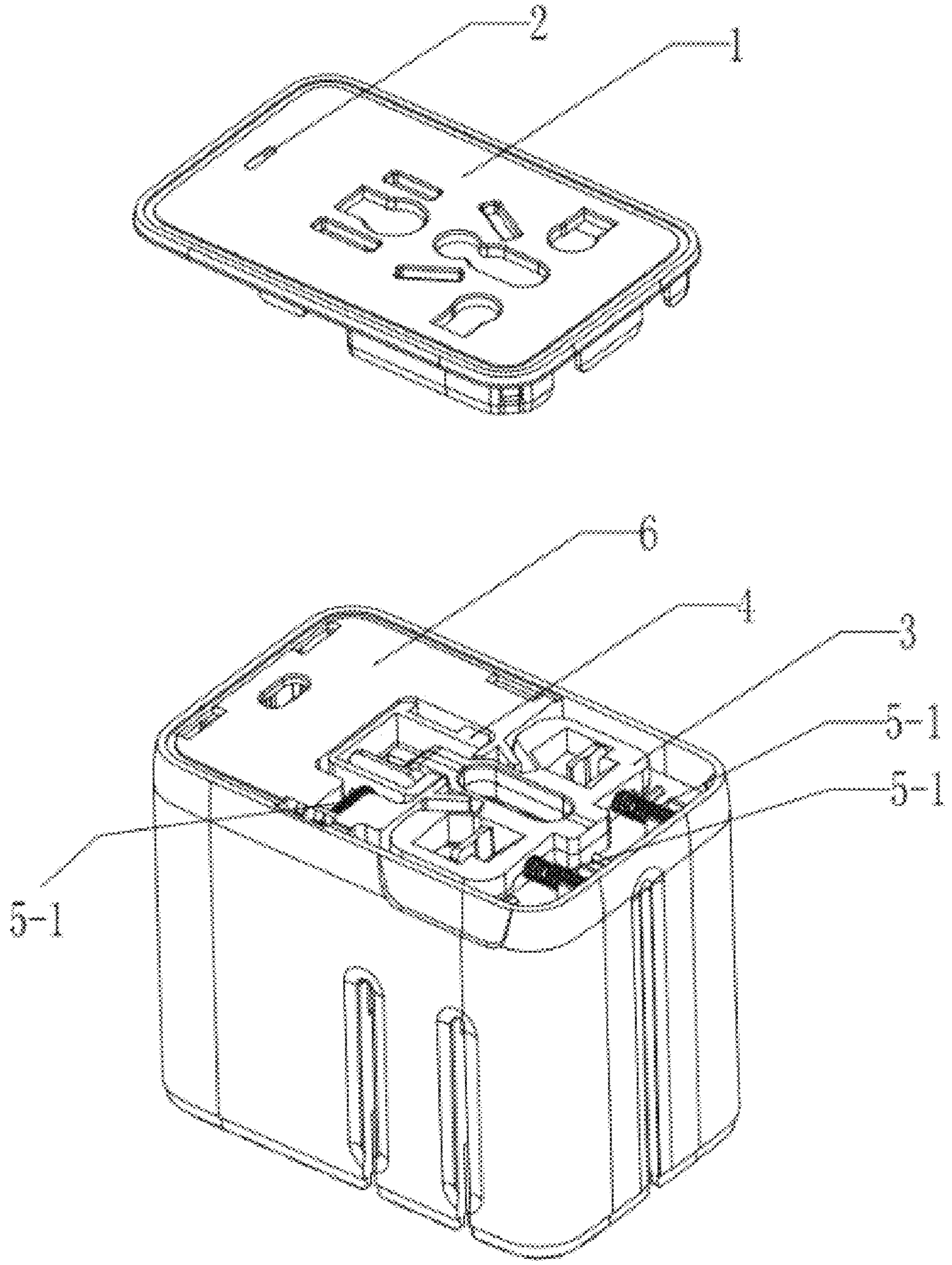
FIG. 5 is an exploded view of a cover and a main body as shown in FIG. 1.
Figure 6:
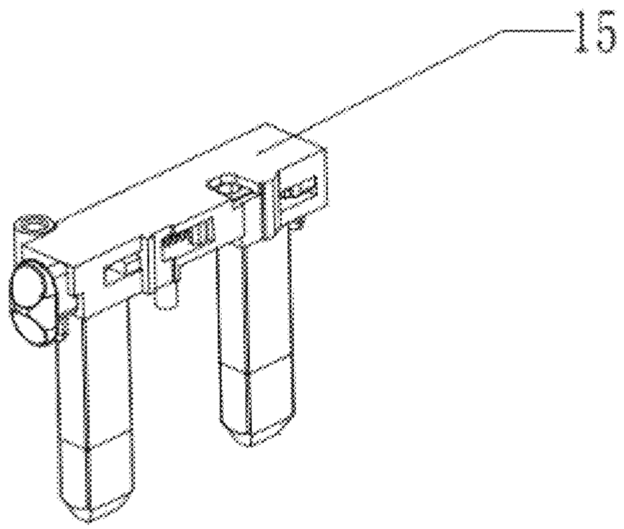
FIG. 6 is a structural schematic diagram of a British standard plug assembly as shown in FIG. 2.
Figure 7:
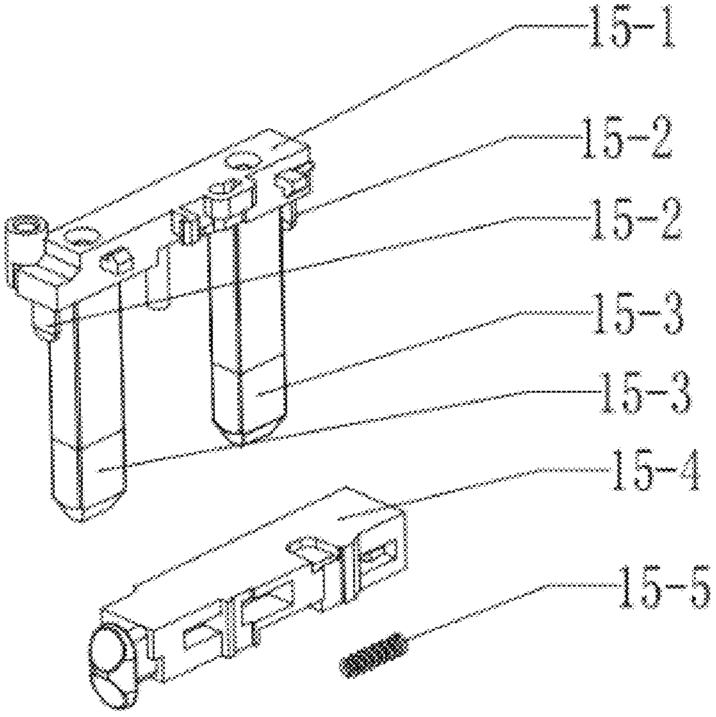
FIG. 7 is an exploded view of the British standard plug assembly as shown in FIG. 2.
Figure 8:
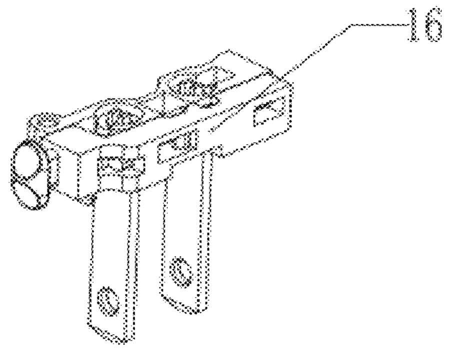
FIG. 8 is a structural schematic diagram of an American-Australian plug assembly as shown in FIG. 2.
Figure 9:
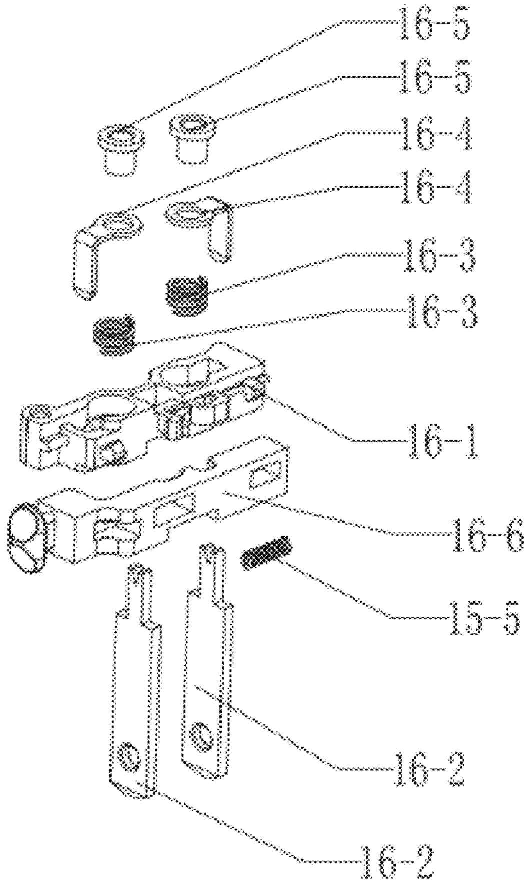
FIG. 9 is an exploded view of the American-Australian plug assembly as shown in FIG. 2.
Figure 10:
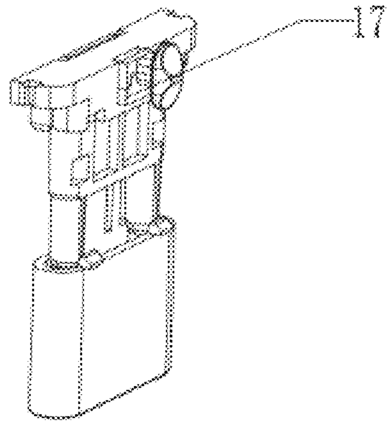
FIG. 10 is a structural schematic diagram of a European standard plug assembly as shown in FIG. 2.
Figure 11:
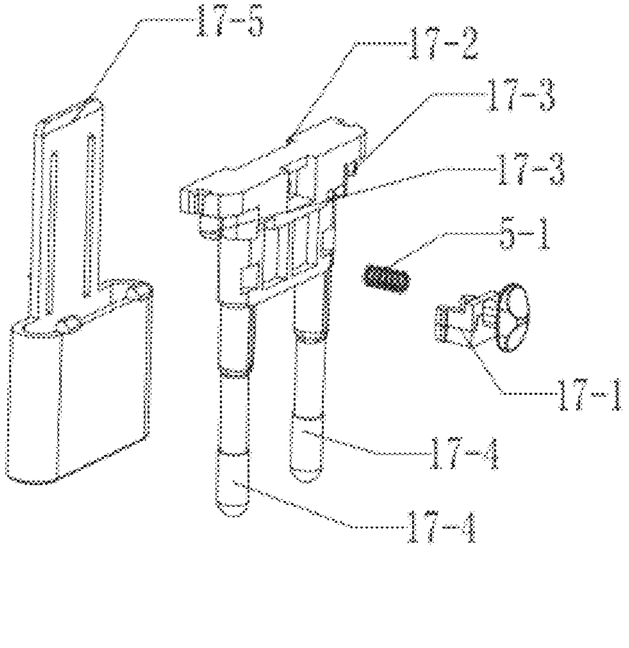
FIG. 11 is an exploded view of the European standard plug assembly as shown in FIG. 2.
Figure 12:
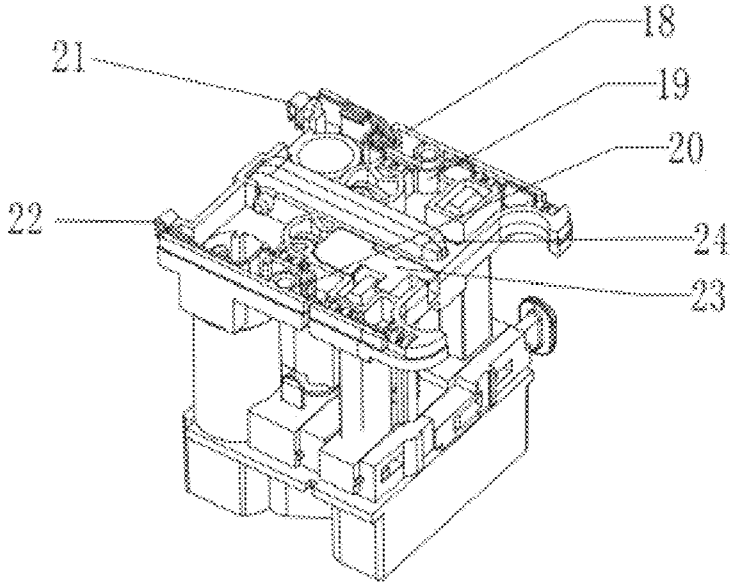
FIG. 12 is a top view of a hardware connection bracket as shown in FIG. 2.
Figure 13:
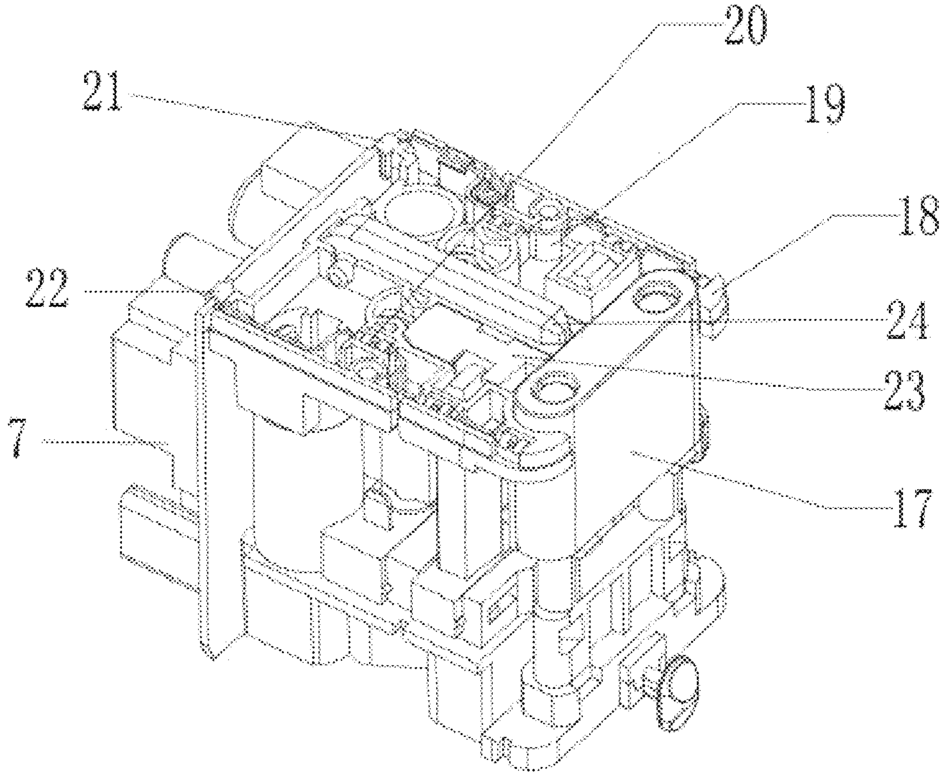
FIG. 13 is a side view of the hardware connection bracket as shown in FIG. 2.
Figure 14:
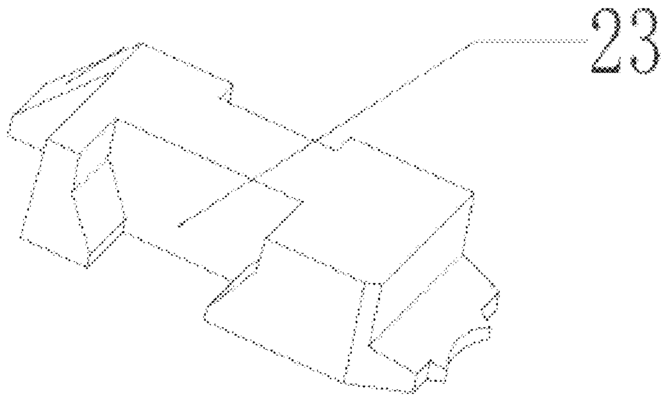
FIG. 14 is a structural schematic diagram of a plug limit block as shown in FIG. 2.
Figure 15:
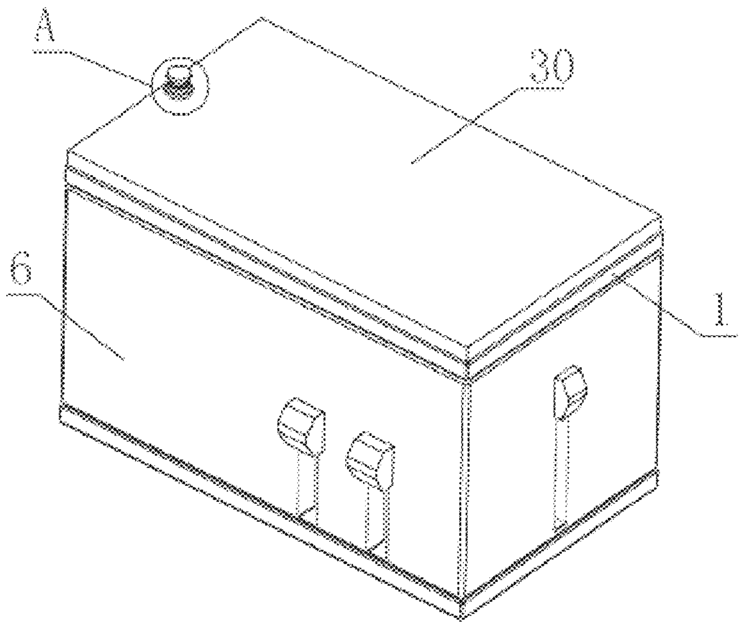
FIG. 15 is another structural schematic diagram of the mini travel power supply conversion socket in accordance with some embodiments of the present disclosure.
Figure 16:
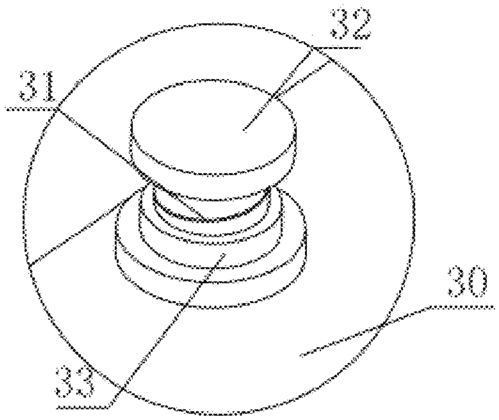
FIG. 16 is an enlarged view of part A as shown in FIG. 15.
Figure 17:
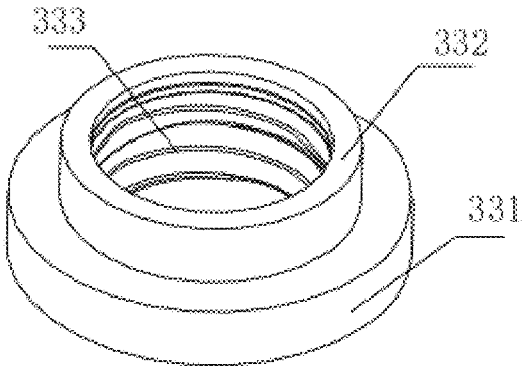
FIG. 17 is a structural schematic diagram of the adjustment component as shown in FIG. 16.

Please refer to FIGS. 1, 2, 3, 4, 5, 6, 7, 8, 9, 10, 11, 12, 13, and 14. FIG. 1 is a structural schematic diagram of a mini travel power adapter socket in accordance with some embodiments of the present disclosure. FIG. 2 is an exploded view of the mini travel power adapter socket in accordance with some embodiments of the present disclosure. FIG. 3 is a top view of the hardware socket bracket as shown in FIG. 2. FIG. 4 is a bottom view of the hardware socket bracket as shown in FIG. 2. FIG. 5 is an exploded view of a cover and a main body as shown in FIG. 1. FIG. 6 is a structural schematic diagram of a British standard plug assembly as shown in FIG. 2. FIG. 7 is an exploded view of the British standard plug assembly as shown in FIG. 2. FIG. 8 is a structural schematic diagram of an American-Australian plug assembly as shown in FIG. 2. FIG. 9 is an exploded view of the American-Australian plug assembly as shown in FIG. 2. FIG. 10 is a structural schematic diagram of a European standard plug assembly as shown in FIG. 2. FIG. 11 is an exploded view of the European standard plug assembly as shown in FIG. 2. FIG. 12 is a top view of a hardware connection bracket as shown in FIG. 2. FIG. 13 is a side view of the hardware connection bracket as shown in FIG. 2, FIG. 14 is a structural schematic diagram of a plug limit block as shown in FIG. 2.

In some embodiments of the present disclosure, a mini travel power conversion socket is provided, including a cover 1, a light guide column 2, a door spring 5-1, a main body 6, and a lower cover 25.

A top of the main body 6 is equipped with a two-prong shutter 3 and a three-prong shutter 4. A PCBA board 7 is provided on one side inside the main body 6. A European standard pin assembly 17 is provided on one side surface of the main body 6. A British standard pin assembly 15 and an American-Australian standard plug assembly 16 are provided on another side surface of the main body 6. The British standard pin assembly 15 includes a British standard plug bracket 15-1, left and right L/N hardware inserts 15-2, left and right L/N pole British standard hardware plugs 15-3, a British standard plug push button 15-4, and a button spring 15-5. The American-Australian standard plug assembly 16 includes an American-Australian standard plug bracket 16-1, American-Australian standard hardware plugs 16-2, support springs 16-3, American-Australian standard hardware inserts 16-4, riveted copper sleeves 16-5, and an American-Australian standard plug push button 16-6. The European standard pin assembly 17 includes a European standard plug sleeve 17-1, a European standard plug bracket 17-2, the left and right L/N hardware inserts 17-3, left and right L/N European standard hardware plugs 17-4, and a European standard pin push button 17-5.

The light guide column 2 is set on a top side of the cover 1, and the door spring 5-1 is set inside the main body 6.

A bottom of the main body 6 is provided with a first L pole 8, a first N pole 9, a hardware socket bracket 10, a fuse connection hardware 11, a copper column connection hardware 13 and a conductive copper column 14-1.

The hardware socket bracket 10 includes a conductive copper column positioning column 10-1 and an assembly groove 10-2.

A top of the lower cover 25 is provided with a hardware connection bracket 18, a second L pole 19, a second N pole 20, a third L pole 21, a third N pole 22, a plug limit block 23 and a British standard ground wire plug 24. The hardware connection bracket 18 includes a first guide limit column 18-1 and a second guide limit column 18-2.

A first fuse 26-1 and a fuse bracket component 27 are provided on both sides inside the lower cover 25.

Insert the light guide column 2 into an adapter hole on the cover 1, and then sequentially install the two-prong shutter 3, three-prong shutter 4, and the door spring 5-1 into a chamber of the main body 6. After assembly, from a top view inside the main body 6, install the PCBA board 7 according to an internal slot guide. From a bottom view, install the European standard plug assembly 17 according to the guide positioning ribs.

On the left and right sides of the hardware socket bracket 10, install the first L pole 8 and the first N pole 9 integrated hardware current guide plates. At the right connection slot of the first N pole 9 hardware current guide plate, sequentially install the fuse connection hardware 11 and then the copper sleeve. Finally, using a riveting process, rivet the first N pole 9 hardware current guide plate to the fuse connection hardware 11 to form a connection. On the back side of the hardware socket bracket 10, on the side slot of the first L pole 8, install the copper column connection hardware 13, and insert the first conductive copper column 14-1 into the circular ring area of the copper column connection hardware 13. In the lower circular hole recess area, insert the second conductive copper column 14-1.

The working principle of the mini travel power supply conversion socket of the present disclosure is described as follows.

During work, the cover 1 is equipped with sockets that can accommodate multi-country plugs, and the shape of these socket holes is relatively independent, providing better guidance for use. The space inside the cover 1 and the main body 6 is designed to work together. On the main body 6, there are two-prong shutter 3 and three-prong shutter 4. In the space where the main body 6 and the lower cover 25 fit together, at the top of the main body 6 when viewed from above, there is the PCBA board 7, and at the bottom when viewed from below, there is the European standard plug assembly 17.

Hardware socket bracket 10, with the first L pole 8 and second N pole 9 integrated hardware guide plates are set on both sides of the hardware socket bracket 10, and a fuse connection hardware 11 is set at the connection point of the first N pole 9 hardware guide plate. On the back side of the hardware socket bracket 10, on the first L pole 8 side, there is a copper column connection hardware 13. And on the conductive copper column positioning column 10-1, there are first and second conductive copper columns 14-1 respectively. On the two conductive copper columns 14-1, there are the British standard plug assembly 15 and the American-Australian plug assembly 16 respectively. After assembling the plug assemblies, insert the first/second guide limit columns 18-1/18-2 from the hardware connection bracket 18 into the assembly groove 10-2 set on the hardware socket bracket 10, simultaneously insert the conductive copper columns 14-1 into the holes that match the hardware connection bracket 18. Finally, in the left and right areas of the hardware connection bracket 18, install the second L pole 19 and second N pole 20 hardware connectors, as well as the plug limit block 23 set on the hardware connection bracket 18, and the rotatable British standard ground wire plug 24 set in the middle of the hardware connection bracket 18. When the above brackets are assembled into a single unit and installed in the central area of the main body 6, connect the third L pole 21 and third N pole 22 to the PCBA connection hardware, embed the connection hardware within the bracket assembly into the connection area between the PCBA gold fingers, install the cover 1 and the lower cover 25, and finally, according to the corresponding holes on the two covers, install the first fuse 26-1 and the fuse bracket component 27, as well as a backup first fuse 26-1 into the corresponding recesses on the lower cover 25. Finally, the backup first fuse and spring 9 is assembled into the assembly, and the lower cover 25 is screwed in clockwise rotation of 90°.

Compared with related technologies, the mini travel power conversion socket provided by the present disclosure has the following beneficial effects.

The present disclosure provides the mini travel power adapter socket, by providing the British, European, and American-Australian standard rotatable adapter plugs, so that the socket section includes a universal socket panel that can accommodate plugs from multiple countries, such as British, European, American, Australian, Italian, and small South African plugs. This product is compact and miniaturized, with a socket safety shutter set in the middle area between the cover 1 and the main body 6. It can support AC plugs/sockets carrying up to 10 A of high current. Inside the hardware socket bracket 10, there is the integrated widened and thickened L/N pole socket hardware guide plate. Below the hardware connection bracket 18, there is the integrated hardware plug guide plate, along with the positioning block that allows individual plug removal. This design not only achieves a miniaturized size but also addresses product safety issues, making it easy to store and carry, while saving on production and transportation costs.

Example 2

Please refer to FIGS. 4 and 5. Based on the above embodiments of this application, another mini travel power adapter socket is provided. This mini travel power adapter socket is merely an optimized version of the above embodiments; its implementation does not affect the individual execution of the above embodiments.

Specifically, the mini travel power adapter socket with the following differences: the mini travel power adapter socket, one side of the top of the cover 1 is fixedly installed with a threaded column 31. The top end of the threaded column 31 is fixedly installed with a blocking block 32. The bottom of the outer surface of the threaded column 31 is fitted with a protective cover 30. The middle of the outer surface of the threaded column 31 is threadedly engaged with an adjustment component 33.

The adjustment component 33 includes a first connecting ring block 331, a second connecting ring block 332, and a threaded hole 333. The first connecting ring block 331 is threadedly engaged with the outer surface of the threaded column 31. The second connecting ring block 332 is fixedly installed in the middle of the top of the first connecting ring block 331, and the threaded hole 333 is located in the middle of the bottom of the first connecting ring block 331.

The threaded hole 333 is connected to the top and bottom of the first connecting ring block 331 and the second connecting ring block 332.

The working principle of the mini travel power supply conversion socket of the present disclosure is described as follows.

When working, the protective cover 30 is first rotated by the threaded column 31, and the protective cover 30 is rotated to expose the plug hole on the top of the face cover 1 for use.

When the protective cover 30 covers the cover 1, the second connecting ring block 332 is rotated, which drives the first connecting ring block 331 to rotate. Through the thread layer 333, it moves downward by engaging with the surface of the threaded column 31. The first connecting ring block 331 presses the protective cover 30 on the top of the cover 1.

Compared with related technologies, the mini travel power conversion socket of the present disclosure has the following beneficial effects.

The mini travel power adapter socket of the present disclosure, by installing the rotatable protective cover 30 on the top of the cover 1, the protective cover 30 can be controlled to rotate when the socket is needed, and to cover the plug holes when not in use. This device has a simple structure and strong practicality, enhancing the protection of the socket and preventing dust from affecting the connection wires, thus extending the service life of the device.

The above description is merely an embodiment of the present disclosure and does not limit the scope of the patent of the present disclosure. Any equivalent structure or process transformation made using the content of the specification and drawings of the present disclosure, or any direct or indirect application in other related technical fields, shall also be included within the scope of the patent protection of the present disclosure.

The invention claimed is:

1. A mini travel power conversion socket, comprising a cover, a light guide column, a door spring, a main body and a lower cover;

wherein a top of the main body is provided with a two-prong shutter and a three-prong shutter, a PCBA board is provided on one side inside the main body, a European standard plug assembly is provided on one side surface of the main body, a British standard plug assembly and an American-Australian standard plug assembly are provided on another side surface of the main body;

wherein the British standard plug assembly comprises a British standard plug bracket, left and right L/N pole hardware inserts, left and right L/N pole British standard hardware plugs, a British standard plug push button, and a button spring;

wherein the American-Australian standard plug assembly comprises an American-Australian standard plug bracket, American-Australian standard hardware plugs, support springs, American-Australian standard hardware inserts, riveted copper sleeves, and an American-Australian standard plug push button;

wherein the European standard plug assembly comprises a European standard plug sleeve, a European standard plug bracket, the left and right L/N pole hardware inserts, left and right L/N European standard hardware plugs, and a European standard plug push button; and wherein the light guide column is set on a top side of the cover, and the door spring is set inside the main body; and wherein a threaded column is fixedly installed on one side of a top of the cover, a top end of the threaded column is fixedly installed with a blocking block, a bottom of an outer surface of the threaded column is fitted with a protective cover, and a middle of the outer surface of the threaded column is threadedly engaged with an adjustment component.

2. The mini travel power conversion socket according to claim 1, wherein a bottom of the main body is provided with a first L pole, a first N pole, a hardware socket bracket, a fuse connection hardware, a copper column connection hardware and a conductive copper column.

3. The mini travel power conversion socket according to claim 2, wherein the hardware socket bracket comprises a conductive copper column positioning column and an assembly groove.

4. The mini travel power conversion socket according to claim 1, wherein a top of the lower cover is provided with a hardware connection bracket, a second L pole, a second N pole, a third L pole, a third N pole, a plug limit block, and a British standard ground wire plug; and the hardware connection bracket comprises a first guide limit column and a second guide limit column.

5. The mini travel power conversion socket according to claim 1, wherein a first fuse and a fuse bracket component are provided on both sides inside the lower cover.

6. The mini travel power conversion socket according to claim 1, wherein the adjustment component comprises a first connecting ring block, a second connecting ring block, and a threaded hole; wherein the first connecting ring block is threadedly engaged with the outer surface of the threaded column, the second connecting ring block is fixedly installed in a middle of a top of the first connecting ring block, and the threaded hole is located in a middle of a bottom of the first connecting ring block.

* * * * *